Oct. 25, 1949.　　　F. MORSE ET AL　　　2,486,316
BOAT LOADING DEVICE
Filed Feb. 24, 1947　　　　　　　　　　　3 Sheets-Sheet 2
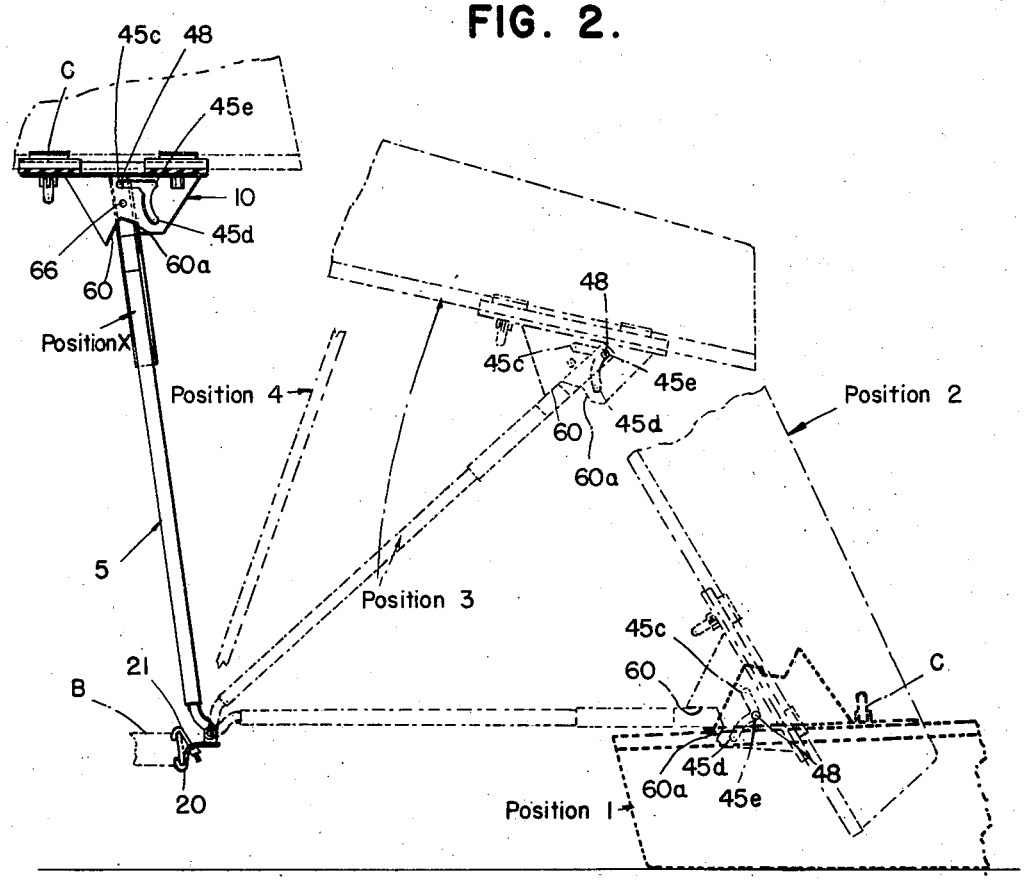
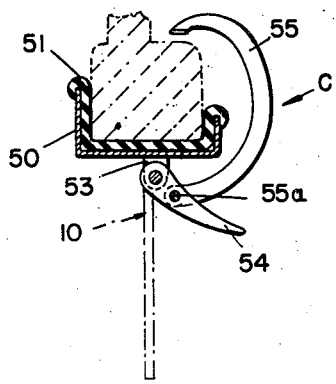
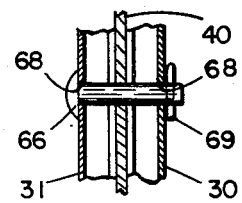
INVENTORS
ALAN W. CHRISTENSEN
AND
FORBES MORSE
BY
ATTORNEYS Oct. 25, 1949.　　F. MORSE ET AL　　2,486,316
BOAT LOADING DEVICE
Filed Feb. 24, 1947　　3 Sheets-Sheet 3
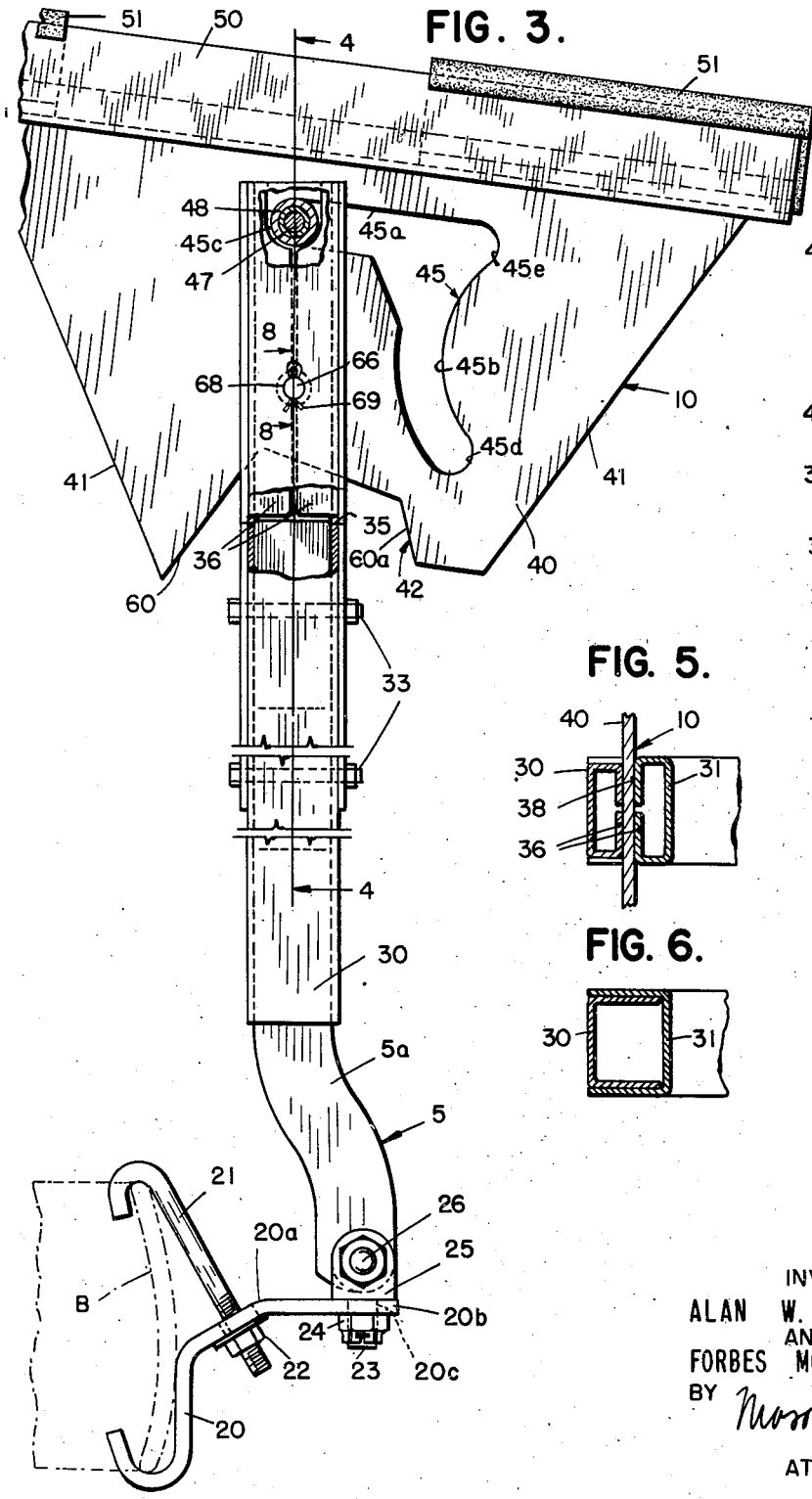
INVENTORS
ALAN W. CHRISTENSEN
AND
FORBES MORSE
BY Morse + Graham
ATTORNEYS Patented Oct. 25, 1949

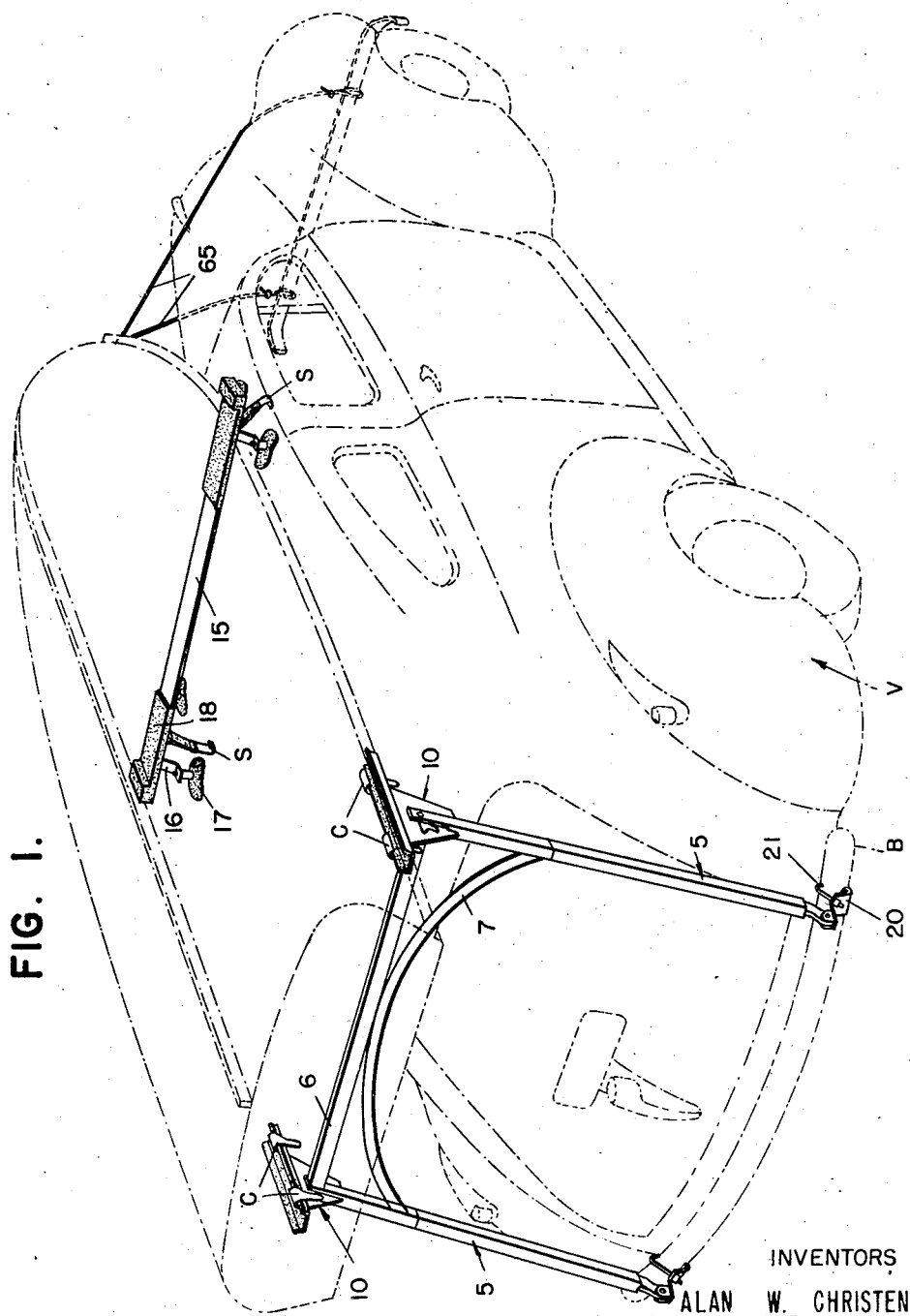

2,486,316

UNITED STATES PATENT OFFICE 2,486,316

BOAT LOADING DEVICE

Forbes Morse and Alan W. Christensen, Los Angeles, Calif., assignors to Western Plastics, Incorporated, Glendale, Calif., a corporation of California Application February 24, 1947, Serial No. 730,272

12 Claims. (Cl. 214—77)

This invention relates to devices for loading boats on to and removing them from the tops of vehicles such as automobiles, as well as for retaining them in secure position on the tops of vehicles while transporting them from one place to another.

As is well known, fishermen, hunters and sportsmen often desire to carry a boat on the top of an automobile, but heretofore certain difficulties have presented themselves in this connection, such as the effort and man power required to load and unload the boat and also the difficulties of firmly and safely retaining the boat in fixed position on the automobile top while it is in slow or high speed motion. While boat loading devices of various sorts have been proposed, those of which we are aware have not effectively solved the problem of rendering it possible or easy for a single person to load or unload a boat nor to drive in safety with clear unobstructed vision forward and backward through the rear view mirror. Some of the prior art devices have been of such character as to enable a single person to load the boat and unload it from an automobile top, but those devices have required great physical exertion and have had the shortcoming that in order to attach the boat-loading device to or detach it from the boat, the simultaneous effort of more than one person was required.

It is therefore among the objects of our present invention to provide a boat loading and unloading device by means of which one person may initially attach the loading device to the boat and detach it therefrom and may also load the boat onto the top of an automobile or the like and unload it therefrom.

It is another object of our invention to provide a device of this character which also retains the loaded boat in secure position while it is being transported from one place to another.

Another object is to provide a device which slides the boat forward of the rear bumper to prevent damage to the boat and to allow the boat to be left on top of the car when the car is in a garage which leaves scant room between the rear bumper and the inside of the garage door when closed.

Another object is to provide a device of this character which is highly economical of manufacture and extremely durable.

The invention possesses still further objects and advantages which, however, will become apparent from the following description of a presently preferred embodiment which has proved to be highly successful and for this purpose we shall refer to the accompanying drawings in which:

Fig. 1 is a perspective view of our loading device with an automobile and boat being shown in dot-dash lines;

Fig. 2 is a side elevation showing various positions assumed by the device during a loading or unloading operation;

Fig. 3 is an enlarged side elevation with some parts shown in section;

Fig. 4 is a section taken on line 4—4 of Fig. 3;

Fig. 5 is a section taken on line 5—5 of Fig. 4;

Fig. 6 is a section taken on line 6—6 of Fig. 4;

Fig. 7 is an enlarged fragmentary view showing, in side elevation, one of the clamping elements; and Fig. 8 is a view taken on line 8—8 of Fig. 3.

It will be understood, of course, that in its broader aspects, as defined by the appended claims, we contemplate that in carrying out our invention it is not always necessary to adhere strictly to the specific details of construction and arrangements shown in the drawings and now to be described, because the ensuing description will suggest to those working in this art various modifications which are embraced in our invention.

In general, we carry out our invention by providing a pair of radius rods which are pivotally attached at their bottom ends to the rear bumper of a vehicle and, at their top ends they are pivotally and slidably attached to a novel type of bracket which in turn is secured to the gunwale of a boat or to a boat adapter. This bracket not only firmly supports the boat while the radius rods are being swung about a 110° arc in the course of loading a boat onto or unloading it from the top of an automobile, but also permits the boat to swing about a 110° arc relative to the radius rods during the moving of the boat from position No. 1, Fig. 2, to position No. 2, Fig. 2, without appreciable movement of the radius rods, and then after the bow of the boat has contacted a cross bar on top of the vehicle at position No. 4, Fig. 2, allows the radius rods to continue forward approximately 40° while the boat bow slides forward on the cross bar. Thus, the actual loading operation is completed. This additional swinging movement of the boat relative to the radius rods permits the brackets to be attached to and detached from the boat by a single operator while the boat is disposed flatly on the ground. These brackets also function, in cooperation with the radius rods, to hold the boat in rigidly suspended position clearing the vehicle onto which it is being loaded or from which it is being unloaded while the loading or unloading operation is taking place. The above described degrees of arc are those obtained in a preferred example of the invention, but may be varied.

Referring now more particularly to the embodiment of the invention shown in the drawings, we show a pair of parallel radius rods generally denoted 5 connected together by a cross bar 6. This assembly is further strengthened by an arched truss 7 secured, as by welding, to the radius rods and to the cross bar.

Adapted to be secured by clamp means C (Fig. 7) to opposite gunwales of a boat, we provide a pair of brackets generally denoted by the numeral 10.

While any suitable means may be employed for supporting the forward end of a boat on a car top after the boat is loaded, we show in the drawings one particular arrangement which we have found satisfactory and this comprises a cross bar 15 having legs 16 to which are secured, respectively, suction cups 17. The end portions of the cross bar are padded as by felt strips 18 so that the gunwales of the boat will not be marred by contact with the cross bar. Straps S may be employed to further anchor the cross bar to the car top.

Also, while any suitable means may be employed for pivotally mounting the lower ends of the radius rods on the rear bumper B of a vehicle V, we prefer the simple, economical and efficient means shown more particularly in Fig. 3, consisting of a bumper clip 20 which has one end hooked under the bottom edge of the bumper, thence has an upwardly and backwardly disposed extension portion 20a provided with a hole to pass the bottom end of a jay-bolt 21 whose top end is hooked over the top edge of the bumper. A nut 22 threaded onto the jay-bolt tightens the attachment to the bumper. The clip 20 terminates in a substantially horizontal extension 20b which has a hole 20c to pass a bolt 23 having a nut 24 threaded thereon, and having on its top end spaced parallel bifurcations 25 between which the bottom end extension 5a of a radius rod is pivoted by a cross bolt 26.

A description of one of the radius rods 5 will suffice for both since they are of identical construction except one is left and one is right.

Each radius rod 5 consists of a relatively long channel iron outer post 30 carrying the curved extension 5a at its bottom end, and a relatively short channel iron inner post 31. These posts 30, 31 are secured together in opposed nested relationship as by bolts 33. To provide a space between the upper ends of the posts 30, 31 to receive the respective brackets 10, each of the posts is provided with a transverse cut 35 and the side wall portions 36 above the cut are bent inwardly. This provides a space or channel 38 through which a bracket 10 may freely move. The truss 7 is secured at its opposite ends to the respective inner posts 31.

The brackets 10 are also of identical construction except left and right and a description of one will suffice for both.

Each of the brackets consists of a plate 40 having side edges 41 which taper from top to bottom and having a recess 42 in its bottom edge. Each plate 40 has a slot 45 presenting a substantially straight top portion 45a and an inwardly curved side portion 45b. This slot provides curved end abutments 45c, 45d and an intermediate abutment 45e.

As stated before, each of the bracket plates 40 is disposed in a channel 38 and a bolt 47, rotatably carrying a spacer sleeve 48 and carrying a nut 49, extends transversely of each radius rod, across the channel 38 and through the slot 45 for the purpose to be described.

Each plate 40 has secured, as by welding, at its top edge, a channeled, boat or adapter-engaging member 50 which is preferably lined with a soft material 51 (Fig. 4) such as rubber or felt to receive the gunwale of a boat. To clamp the gunwale in the channel, each of the channel members 50 has two longitudinally spaced pairs of depending ears 53 and between each pair there is pivoted a lever 54, to which in turn is pivoted, as by a cotter pin 55a, a clamping arm 55, whose hooked free end is engageable over the gunwale and the other end of which projects for manual operation. Thus to free the clamp, the lever is swung outwardly (to the right in Fig. 7) and to tighten the clamp the lever is swung in the opposite direction.

Operation of the device is as follows, referring more particularly to Fig. 2:

In Fig. 2 the boat is shown in five sequential positions identified as position 1, position 2, position 3, position 4 and position X. In position 1 the boat is shown resting horizontally upon the ground, in which position a single person may easily clamp the brackets 10 to the gunwales of the boat. Next, the user swings the boat about a 110° arc relative to the radius rods to position 2. In this latter position the boat is passed upright and the abutment surface 60 provided in each plate by recess 42 engages the cooperating radius rod 5 at a point immediately below the channel 38, while each sleeve 48 engages in the abutment portion 45e of the slot 45. Thus the top portion of the boat, consisting of approximately 20% of its weight, is upwardly beyond the fulcrum 26 which counterbalances a like portion of the boat weight and reduces the weight to be lifted on, for instance, a 12-foot, 110-pound boat, to less than 70 pounds. Thus as the boat is lifted to position 3 the abutment surfaces 45e, 60 prevent the forward end of the boat from swinging further downwardly, so that the operator does not have to hold up the forward end of the boat to prevent it from falling against the top of the car. When the radius arms reach position 4, the boat will be substantially in horizontal inverted position, with its forward end just establishing contact with the cross bar 15. The boat is then pushed forwardly, its forward end sliding over the bar 15, to position X, in which position the respective sleeves 48 engage abutments 45c, while the radius arms move out of engagement with abutment surfaces 60 and contact surfaces 60a. Also, in position X the transom of the average boat is forward of the rear bumper of the car which prevents damage if the car is backed into an obstruction and also allows garage doors to be closed. This is the fully loaded and transporting position, and we provide simple means for locking the device in this position to prevent the boat from accidentally sliding backwardly on cross bar 15 into position 4, in case the particular anchor strap 65, which anchors the front end of the boat to the vehicle, is not used. This latter means consists of providing registering holes 68 in the upper ends of each set of posts 30, 31 going to make up the respective radius rods, and in the respective plates 40, and through each set of registering holes we mount a pin 66 which locks the parts against further swinging movement. The pins 66 are held against axial movement as by cotter pins 69.

To unload the boat, the pins 66 are removed and the straps 65 unfastened. Then the operator pulls backwardly on the back end of the boat, which swings the radius rods and boat sequentially from position X to position 2. Then the operator swings the boat approximately 110° from position 2 to position 1, in which latter position he can release the clamps to free the boat from the loading device.

For storing or shipping purposes, the loading device may be disassembled by detaching the bolts 26 from the bumper clips, by detaching posts 5 from truss 7 by removing bolts 47.

We contemplate that a single radius rod 5 and cooperating plate 40 may suffice in some cases where it is possible to attach the bracket 10 to some part of the boat intermediate its sides.

We claim:

1. A device for loading a boat onto and unloading it from the top of a vehicle or the like, comprising a pair of radius rods, means for pivotally mounting the bottom ends of the rods on a vehicle, bracket means pivotally carried by the upper ends of the rods, said bracket means having means for detachably securing them to a boat, and abutment means on the rods and bracket means for limiting pivotal movement of the bracket means relative to the rods in one direction.

2. A device for loading a boat onto and unloading it from the top of a vehicle or the like, comprising a pair of radius rods, means for pivotally mounting the bottom ends of the rods on a vehicle, bracket means pivotally carried by the upper ends of the rods, said bracket means having means for detachably securing them to a boat, and abutment means on the rods and bracket means for limiting pivotal movement of the bracket means relative to the rods in one direction, said bracket means being rotatable in the opposite direction relative to the rods to an extent of at least 110°.

3. A device for loading a boat onto and unloading it from the top of a vehicle or the like, comprising: a pair of radius rods each having a bifurcated top end and a bottom end adapted for pivotal connection to a vehicle, a pair of brackets each having means for detachably securing it to a boat and each having a depending plate disposed between the bifurcations of a cooperating radius rod, and a slot in said plate, a cross pin carried by the bifurcated end of each radius rod and extending through and being movable along the respective slots, each of said plates presenting an abutment shoulder engageable with a radius rod below its bifurcated end and an abutment surface exposed to its slot and engageable with a cross pin to limit swinging movement of its carrying bracket in one direction relative to the radius rod, each of said slots being shaped to permit each bracket to swing about an arc in the opposite direction.

4. A device for loading a boat onto and unloading it from the top of a vehicle or the like, comprising: a pair of radius rods each having a bifurcated top end and a bottom end adapted for pivotal connection to a vehicle, a pair of brackets each having means for detachably securing it to a boat and each having a depending plate disposed between the bifurcations of a cooperating radius rod, and a slot in said plate, a cross pin carried by the bifurcated end of each radius rod and extending through and being movable along the respective slots, each of said plates presenting an abutment shoulder engageable with a radius rod below its bifurcated end and an abutment surface exposed to its slot and engageable with a cross pin to limit swinging movement of its carrying bracket in one direction relative to the radius rod, each of said slots being shaped to permit each bracket to swing at least 110° in the opposite direction relative to its cooperating radius rod.

5. A device for loading a boat onto and unloading it from the top of a vehicle or the like, comprising: a pair of radius rods each having a bifurcated top end and a bottom end adapted for pivotal connection to a vehicle, a pair of brackets each having means for detachably securing it to a boat and each having a depending plate disposed between the bifurcations of a cooperating radius rod, and a slot in said plate, a cross pin carried by the bifurcated end of each radius rod and extending through and being movable along the respective slots, each of said plates presenting an abutment shoulder engageable with a radius rod below its bifurcated end and an abutment surface exposed to its slot and engageable with a cross pin to limit swinging movement of its carrying bracket in one direction relative to the radius rod, and lock means for securing the brackets and radius rods against relative movement.

6. A pair of radius rods each having a bifurcated top end and a bottom end adapted for pivotal connection to a vehicle, a pair of brackets each having means for detachably securing it to a boat and each having a depending plate disposed between the bifurcations of a cooperating radius rod, and a slot in said plate, a cross pin carried by the bifurcated end of each radius rod and extending through and being movable along the respective slots, each of said plates presenting an abutment shoulder engageable with a radius rod below its bifurcated end and an abutment surface exposed to its slot and engageable with a cross pin to limit swinging movement of its carrying bracket in one direction relative to the radius rod, and lock means for securing the brackets and radius rods against relative movement, consisting of pin means extending through each plate, slot and the bifurcations of its cooperating radius rod.

7. A loading device comprising a radius rod, means for pivotally anchoring one end of the rod to permit the rod to swing about a radius, a bracket for attachment to an article to be loaded, and means for pivotally and slidably connecting the other end of the radius rod to the bracket, said latter means presenting opposed abutment surfaces limiting pivotal movement of the bracket relative to the radius rod.

8. A loading device comprising a radius rod, means for pivotally anchoring one end of the rod to permit the rod to swing about a radius, a bracket for attachment to an article to be loaded, and means for pivotally and slidably connecting the other end of the radius rod to the bracket, said latter means including a pin on the radius rod and a slot in the bracket through which the pin extends and along which the pin is movable, the slot being disposed to permit the bracket to swing in an arc relative to the radius rod.

9. A device for loading a boat on and unloading it from the top of a vehicle or the like comprising a pair of radius rods, pivot means for swingably securing the rods to a lower part of a vehicle, a pair of upright plates adapted to be secured to opposite gunwales of a boat, each of the plates having a slot and having spaced, opposed depending abutments engageable with a radius rod, and abutment means carried by the respective radius rods and extending through said respective slots, said respective slots providing end and intermediate abutment surfaces selectively engageable with the last-named abutment means carried by the respective radius rods and being shaped to permit the respective plates to swing about an arc relative to the respective radius rods.

10. A device for loading a boat on and unloading it from the top of a vehicle or the like comprising a pair of radius rods, pivot means for swingably securing the rods to a lower part of a vehicle, a pair of upright plates adapted to be secured to opposite gunwales of a boat, each of the plates having a slot and having spaced opposed depending abutments engageable with a radius rod, and abutment means carried by the respective radius rods and extending through said respective slots, said respective slots being substantially L-shaped whereby to provide end and intermediate abutment surfaces selectively engageable with the last-named abutment means carried by the respective radius rods and to permit swinging movement of the respective plates relative to the respective radius rods.

11. A device for loading a boat on and unloading it from the top of a vehicle or the like comprising a pair of radius rods, pivot means for swingably securing the rods to a lower part of a vehicle, a pair of upright plates adapted to be secured to opposite gunwales of a boat, each of the plates having a slot and having spaced, opposed depending abutments engageable with a radius rod, and abutment means carried by the respective radius rods and extending through said respective slots, said respective slots being shaped to provide an end abutment surface cooperable with the respective last-named abutment means and aligned with one of said depending abutments and another abutment surface intermediate its ends cooperable with said respective last-named abutment means and aligned with the other depending abutment, the distance between said abutment surfaces being sufficient to permit the respective plates to swing about a 110° arc relative to the respective radius rods.

12. A device for loading a boat on and unloading it from the top of a vehicle or the like comprising a radius rod having at its inner end means for pivotal attachment to a lower part of a vehicle, the outer end of the rod having bifurcations, a plate disposed between the bifurcations and having means for attachment to a boat, a substantially L-shaped slot in the plate, providing end and intermediate abutment surfaces, depending abutment members on the plate aligned respectively with the intermediate and an end abutment surface of the plate, said abutment members being selectively engageable by the radius rod portion below the bifurcations, and a cross pin carried by the radius rod and extending across the slot in the plate, said cross pin being selectively engageable with said abutment surfaces.

FORBES MORSE.
ALAN W. CHRISTENSEN.

REFERENCES CITED

The following references are of record in the file of this patent:

UNITED STATES PATENTS

| Number | Name | Date |
| --- | --- | --- |
| 2,180,032 | Casley | Nov. 14, 1939 |
| 2,294,864 | Palmer | Sept. 1, 1942 |
| 2,361,592 | Bjork | Oct. 31, 1944 |
| 2,392,008 | Squires | Jan. 1, 1946 |
| 2,395,173 | Dobler | Feb. 19, 1946 |
| 2,412,162 | Lindblom | Dec. 3, 1946 |
| 2,414,684 | Wohlforth | Jan. 21, 1947 |